(12) United States Patent
Cook et al.

(10) Patent No.: US 6,950,145 B2
(45) Date of Patent: Sep. 27, 2005

(54) TELEVISION ANALOGUE AND DIGITAL CONVERTOR APPARATUS

(75) Inventors: Michael Cook, Haslingden (GB); Stuart Griffin, Shipley (GB)

(73) Assignee: Pace Micro Technology Plc, Shipley (GB)

( * ) Notice: Subject to any disclaimer, the term of this patent is extended or adjusted under 35 U.S.C. 154(b) by 512 days.

(21) Appl. No.: 10/102,519

(22) Filed: Mar. 20, 2002

(65) Prior Publication Data

US 2002/0180886 A1 Dec. 5, 2002

(30) Foreign Application Priority Data

Mar. 21, 2001 (GB) .............................................. 0106981

(51) Int. Cl.[7] .............................. H04N 3/27; H04N 5/50
(52) U.S. Cl. ...................................... 348/554; 348/731
(58) Field of Search .............................. 348/554, 553, 348/725, 705, 706, 731–733; H04N 5/44, 5/50, 3/27

(56) References Cited

U.S. PATENT DOCUMENTS 6,154,505 A * 11/2000 Konishi et al. ............. 348/731

FOREIGN PATENT DOCUMENTS

WO    WO 00/57640    9/2000    ............ H04N/5/44

OTHER PUBLICATIONS

Patent Abstract of Japan vol. 2000, No. 11, Jan. 3, 2001 for Re-Transmitter for CATV System, Applicant Miharu Tsushin KK.

* cited by examiner

*Primary Examiner*—Sherrie Hsia
(74) *Attorney, Agent, or Firm*—Head, Johnson & Kachigian

(57) ABSTRACT

A television system comprising a television set with at least one television tuner, and a broadcast data receiver for selective operation to receive data for the generation of one of a number of selectable television channels, and a detector to detect spectral emissions from the television tuner. The spectral emissions are a value from the local oscillator to allow identification of an analogue channel selected for display by the user. The broadcast data receiver is controlled to decode and process digital data relating to the identified analogue channel and display the processed digital data to produce the selected channel via the television system.

5 Claims, 1 Drawing Sheet

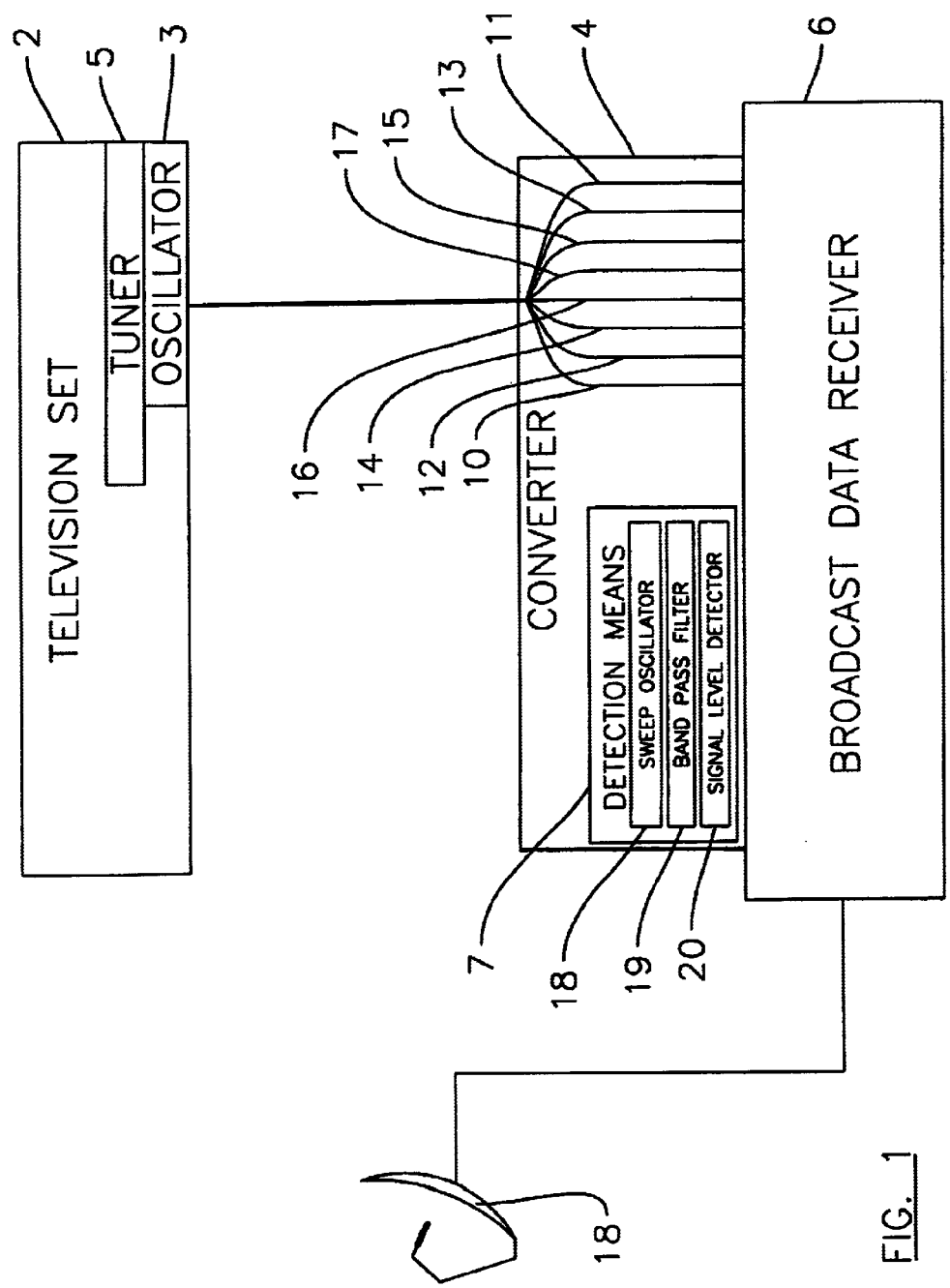

TELEVISION ANALOGUE AND DIGITAL CONVERTOR APPARATUS

CROSS-REFERENCE TO RELATED APPLICATION

This is an United States Application entitled "A Television Analogue And Digital Data Converter Apparatus" which claims priority from British Application No. 0106981.4 filed 21 Mar. 2001.

STATEMENT REGARDING FEDERALLY SPONSORED RESEARCH OR DEVELOPMENT (NA)

INCORPORATION-BY-REFERENCE OF MATERIAL SUBMITTED ON A COMPACT DISC (N/A)

BACKGROUND OF THE INVENTION

The present invention relates to a television system comprising a television set (TV) having a display screen and speakers and a tuner for receiving conventional or "legacy" analogue data from which television channels can be generated, and a broadcast data receiver for receiving data transmitted via a digital data system and from which digital data television channels can be generated.

In due course the broadcasting of conventional analogue data television channels will be discontinued and wholly replaced by the use of digital data television channels.

In order to continue to use analogue TV equipment after the analogue data service is switched off, will require the provision of conversion devices that allow the conversion of the new digital data transmissions into a form which can be shown on conventional analogue equipment.

With the advent of digital terrestrial television, many governments, broadcast authorities and other radio frequency (RF) spectrum managing authorities are seeking to switch off the conventional analogue TV transmissions as soon as possible. Unfortunately, this will leave a very large number of previously installed "legacy" analogue TV equipment which, without updating, will be unable to operate. The inability to operate their TV apparatus will lead to frustration, considerable grievance and potential loss of viewers which is an important problem especially for those broadcasters which rely on advertising revenue.

One proposed solution is to provide a converter device that can receive and decode digitally transmitted data and remodulate the data in a form that can be received by the analogue equipment. However, the problem with this system is that data for each of the large number of channels which can be selected has to be processed simultaneously therefore leading to an unacceptable and/or uneconomical amount of processing power being required and computer memory and associated hardware being required and therefore costing more than the cost of replacing the "legacy" TV apparatus which it is intended to avoid.

However, it is equally clear that in order to allow the existing analogue equipment to be used with digital data broadcast TV services, a form of converter device is required. Existing Digital Broadcast Data Receivers (BDR's) for digital transmission systems are significantly more sophisticated than necessary for many consumers who in practice will simply want to watch the existing traditional or free to air "channels" (i.e., the user is not required to subscribe to the same) such as, in the UK, BBC1, BBC2, ITV, Ch.4 and Ch.5. Furthermore this type of BDR requires its own remote control to allow the user to change channels and set operating parameters and is more sophisticated and expensive than is required, especially when one considers that the Government or other authorities will probably wish to provide the BDR apparatus at a reduced cost.

A cost effective conversion device would only receive and decode one digital signal, but this signal must correspond to the channel that the analogue TV equipment, and hence the viewer, expects to watch following the viewer television channel selection. The problem is therefore how to discern what channel the TV equipment expects to receive and to provide the appropriate channel.

The aim of the invention is to utilize a digital to analogue converter but in a manner so as to seek to minimize the functionality required for the converter by detecting what channel the conventional or legacy TV receiver is tuned to and using that channel information to direct the converter device and BDR connected thereto to only process the RV channel that is required. Thus, the analogue TV equipment and the viewer should not be aware that the channel selected for viewing is generated from digital data rather than analogue data and hence is not affected by the removal of the analogue TV service.

BRIEF SUMMARY OF THE INVENTION

In a first aspect of the invention there is provided a television system comprising a television set with at least one television tuner for the reception of analogue data and a broadcast data receiver for the reception of digital data, both the tuner and broadcast data receiver selectively operable by a viewer to allow the generation of one of a number of viewer selectable television channels, and characterised in that when the viewer channel selection is made via the television set detection means are provided to detect spectral emissions from the television set tuner that are of a value generated by the television local oscillator in response to the tuner setting, said detected spectral emission indicative of the particular television channel, from the range of available channels, selected for display by the viewer, and said broadcast data receiver controlled to receive digital data for the identified selected television channel, decode and process the same and display said processed digital data to generate the selected channel via the television set for the viewer.

In one embodiment the detection means includes the use of a sweeping oscillator, band pass filter and signal level detector which are used to detect the television tuner local oscillator peaks. Typically, the peaks are compared with a frequency table which indicates at what frequency the analogue channels were previously transmitted. From this the television analogue channel is identified and the appropriate digital channel is decoded via the Broadcast Data Receiver and the channel signal is sent to the TV set for display to the viewer.

Thus, in accordance with the invention, there is provided a relatively low cost conversion device which operates even with the switching off of the analogue television channel transmissions and without the viewer being unduly affected, noticing or having to make wholesale purchases of new digital data apparatus. This is achieved as the viewer can continue to make the television channel selections using the existing television apparatus and in the normal way with the only difference being that rather than the selected television channel being generated from analogue transmissions, the same is generated from the appropriate digital data received from the broadcast data receiver.

In one embodiment there is provided a system whereby the change in the input characteristics of the analogue TV are detected and, as a result of the detected change, the identity of the television channel is identified and the corresponding digital TV channel determined so that the said digital channel is generated and the video and audio fed to the television set for display.

In one the detection of the selected television channel is achieved by utilizing changes in the electrical characteristics of the RF input of the analogue television so that the Broadcast Data Receiver (BDR) can detect the frequency that the television tuner is tuned to. This frequency information is used with reference to a table of analogue channels and their frequencies, to firstly identify the television channel for the identified frequency and, once achieved, the digital data for the identified channel, or equivalent, is selected by the broadcast data receiver to decode and present to the analogue television set.

According to a second aspect of the present invention there is provided a conversion device for use with a television system, said television system comprising an analogue television set with at least one television tuner and a broadcast data receiver connected to the television set for selective operation to receive digital data for the generation of one of a number of selectable digital television channels, and characterized in that said conversion device is connected to the television set and broadcast data receiver and provided with means to detect the frequency to which the television set tuner is set following a viewer channel selection, said frequency setting indicative of a particular analogue television channel previously transmitted at that frequency, and said conversion device identifying the selected television channel and the broadcast data r4eceiver controlled decode, collect and process digital data for the channel equivalent to the analogue television channel selected by the viewer, and display said processed digital data via the television set to the viewer.

In one embodiment the converter device is provided as part of the broadcast data receiver.

BRIEF DESCRIPTION OF THE DRAWINGS

A specific embodiment of the invention is now described with reference to the accompanying drawing, wherein:

FIG. 1 illustrates, in schematic fashion, a system in accordance with the invention.

DESCRIPTION OF THE PREFERRED EMBODIMENTS

FIG. 1 illustrates an analogue television set 2 connected to a converted device 4 which in turn is connected to a broadcast data receiver 6. The television set includes a tuner 5 which is responsive to a user selection of a particular TV channel from a range of TV channels. The tuner tunes to a set frequency (RE). However, if the analogue system is discontinued in accordance with future plans the analogue data for the selected channel is not broadcast at the frequency and thus, without this invention as now described, no television channel could be displayed.

When an analogue TV receiver tunes to a specific frequency the input impedance of the tuner changes in accordance with the frequency it is tuned to. These changes are detected from the local oscillator 3 in the television set 2 which feeds the RE signals into the TV. This spectral emission in terms of the impedance value is used in the invention to select the appropriate digital TV channel to feed to the TV.

In one embodiment the detection means 7 includes the use of a sweeping oscillator 18, band pass filter 19 and signal level detector 20 which are used to detect the television tuner local oscillator peaks.

In one example, the television set 2 is provided so that the viewer has a range of eight television channel selections and, the same eight TV channels are received as a free to air digital television service by the broadcast data receiver 6 via, in this case, satellite antenna 18. Thus the converter device 4 of the invention generates eight carriers 10–17 in an unmodulated form with token (none program content) video, and is connected to the television set 2. A circuit in the converter monitors the state of the carriers 10–17 and any change in the state of one of the carriers indicates that a viewer channel selection has been made via the television set and the analogue TV equipment is now tuned into that particular TV channel carrier frequency as a result of the viewer selecting that particular channel from the eight channels. The conversion device 4 uses this change and the identification of the channel represented by the carrier to switch the digital data tuning, decoding and processing circuits of the broadcast data receiver 6 to the equivalent digital data TV channel and begins outputting modulated audio and video generated from the received digital data for the identified digital television channel, said audio and video is then passed along the appropriate carrier to the television set for display to the viewer who can then view and listen to the selected TV channel.

The change in input impedance of the analogue TV equipment can be monitored by several different methods. One such method includes detecting the carrier voltage. The voltage of each of the carriers is measured and a change in impedance of the analogue TV equipment can be detected by a change in carrier voltage. Secondly, VSWR (Voltage Standing Wave Ratio) can be detected and this changes depending upon the input impedance of the analogue TV equipment, in response to changes in the television channel selected by the viewer.

As an alternative to using a number of carriers simultaneously, one carrier can be used, and its frequency rapidly changed until the frequency to which the analogue television set is detected and hence the selected channel identified. In this case it can be easier to detect the impedance changes necessary for the correct switching information to be derived.

There are at least two ways in which this architecture can operate. In a first method the remodulated television channels can be at fixed frequencies, which require the analogue TV set to be re-tuned to the appropriate frequencies. This may be necessary if the existing analogue TV service is still being transmitted at the time of the installation of the conversion device. If the analogue service is suspended or terminated then the re-tuning is not required, in which case a second method can be used in that the remodulation channels of the television set can be set by the conversion device to match those to which the analogue TV equipment was already tuned to.

The electronic and processing requirements of any converter device are reduced to that of a single channel converter thus saving on duplicated circuitry and expense. By adopting this architecture the legacy analogue TV equipment appears to the viewer to operate in the same way as it did previously, with the same channels being displayed in response to the viewer's channel selections.

In practice the converter device will typically be purchased from a retailer and connected to a TV aerial with the analogue TV set is plugged into the converter device. The analogue TV equipment than has access to all the free to air digital TV programmes and works as before.

What is claimed is:

1. A television system, said system comprising:

a television set with at least one television tuner for the reception of analogue data; and a broadcast data receiver for the reception of digital data, both the tuner and broadcast data receiver selectively operable by a viewer to allow the generation of one of a number of viewer selectable television channels, and detection means are provided when a viewer channel selection is made via the television set to detect spectral emissions from the television set tuner, the spectral emission are of a value generated by a local oscillator in the television in response to a tuner setting, said detected spectral emission indicative of a particular television channel, from the range of available channels, selected for display by a viewer, and said broadcast data receiver controlled to receive digital data from an identified selected television channel, decode and process same and display said processed digital data to generate a selected channel via said television set for a viewer.

2. A television system according to claim 1 characterized in that the detection means detects the tuner local oscillator peaks.

3. A television system according to claim 1 characterised in that the detection means includes a sweeping oscillator, band pass filter and signal level detector.

4. A conversion device for use with a television system, said television system comprising an analogue television set with at least one television tuner and a broadcast data receiver connected to the television set for selective operation to receive digital data for the generation of one of a number of selectable digital television channels, and characterised in that said conversion device is connected to the television set and broadcast data receiver and provided with means to detect the frequency to which the television set tuner is set following a viewer change selection, said frequency setting indicative of a particular analogue television channel previously transmitted at that frequency, and said conversion device identifying the selected television channel and the broadcast data receiver controlled to decode, collect, and process digital data for the channel equivalent to the analogue television channel selected by the viewer, and display said processed digital data via the television set to the viewer.

5. A converter device according to claim 4 characterized in that said converter device is provided in the broadcast data receiver.

* * * * *